J. L. CREVELING.
ELECTRIC REGULATION.
APPLICATION FILED JUNE 21, 1911.
1,166,442.
Patented Jan. 4, 1916.
Fig. I.
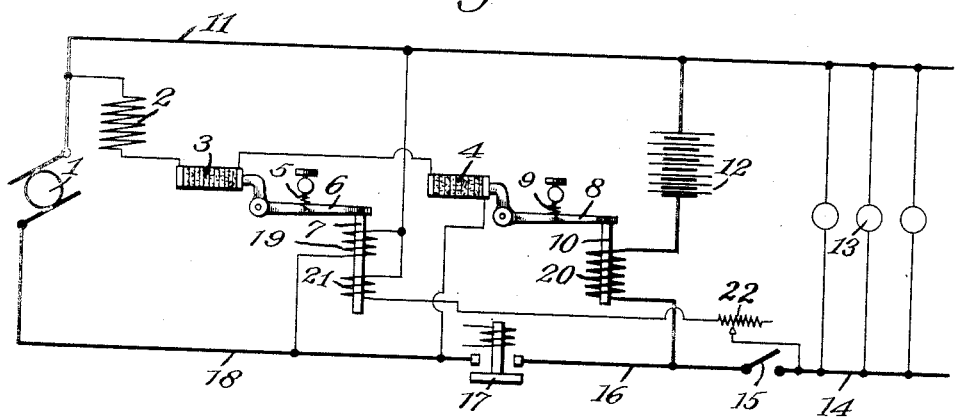
Fig. II.
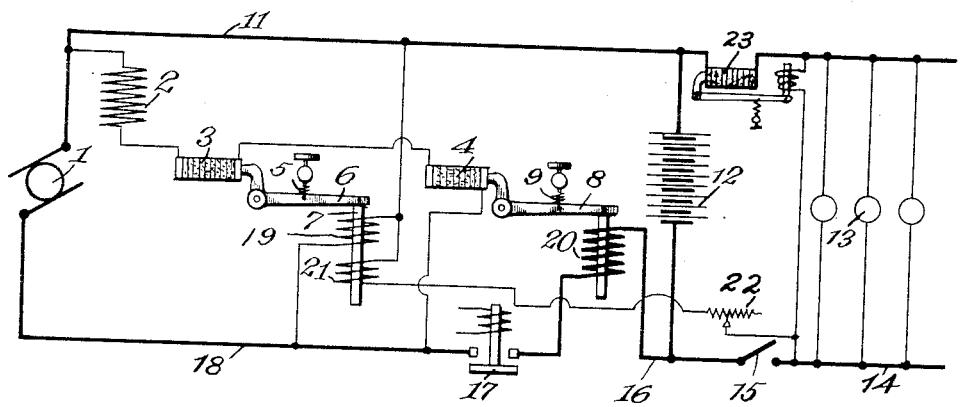
INVENTOR
John L. Creveling

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,166,442.

Specification of Letters Patent. Patented Jan. 4, 1916.

Application filed June 21, 1911. Serial No. 634,492.

*To all whom it may concern:*

Be it known that I, JOHN L. CREVELING, a resident of New York, in the county and State of New York, have invented certain new and useful Improvements in Electric Regulation, as set forth in the annexed specification and drawing, forming a part thereof.

My invention pertains to that class of electric regulation wherein it is desired to automatically regulate a generator in a predetermined manner.

My invention has for its particular object to automatically govern a generator in accordance with the duty performed thereby.

Figure I is a diagrammatic representation of one type of system embodying the essentials of my invention. Fig. II is a diagrammatic representation of a modification of the system portrayed in Fig. I.

In the drawing, referring particularly to Fig. I, 1 represents a dynamo or generator provided with the usual field coil 2, having in series therewith the variable resistances 3 and 4 which, in this instance, are indicated as of the carbon pile variety for sake of simplicity. The resistance 3 is provided with the lever 6 normally drawn in an upward direction as by the adjustable spring 5. The resistance 4 is provided with the lever 8 normally drawn upwardly as by the adjustable spring 9. The levers 6 and 8 are provided with cores 7 and 10 in such manner that downward pull upon the same tends to move the levers against the action of springs 5 and 9 in such manner as to reduce the pressure upon the carbon piles 3 and 4, and increase the resistance thereof for the purpose of regulation as will hereinafter more plainly appear. 11 represents the positive lead of the generator which is connected with the positive side of the storage battery 12 and positive terminals of the lamps or other translating devices indicated at 13. The opposite terminals of the translating devices are connected with the main 14 which is carried to one side of the work circuit switch 15, the opposite side of which is connected as by the wire 16 with one terminal of the automatic switch 17 which may be of any of the well-known varieties adapted to close the generator circuit when its voltage is substantially equal to that of the battery and the opposite terminal of said switch 17 is connected as by the lead 18 with the negative side of the generator 1. The negative terminal of the storage battery 12 is connected with the wire 16 through the coil 20 surrounding the core 10 in such manner that current in said coil tends to depress the lever 8 and increase resistance 4. The core 7 is surrounded by a coil 19 in shunt across the generator circuit so as to measure the voltage thereof and its excitation tends to draw the core 7 downwardly and increase the resistance 3. The coil 21 is also wound in operative relation to the core 7 and so connected with respect to coil 19 that when energized it assists the said coil 19 as will hereinafter appear. The coil 21 is in connection with the positive lead 11 and the wire 14 and it is thus obvious that the same is energized when the work circuit switch 15 is closed and inoperative when said switch is open. 22 is an adjustable resistance whereby the action or effect of the coil 21 may be adjusted.

The system of Fig. II, it will be noted, is identical with that of Fig. I with the exception that the coil 20 in Fig. I is in series with the battery circuit and affected by battery current only, and in Fig. II the said coil is traversed by the total generator current and in said figure 23 indicates a lamp or translation circuit regulator which may be of any of the usual types and in this instance is shown as a variable resistance of the carbon pile variety operated by a solenoid or coil in shunt across the translation circuit.

The operation of my invention is substantially as follows reference being had to Fig. I: If the generator be running, current will flow through the field coil 2 and resistances 3 and 4 in series therewith, and the generator may be regulated by proper manipulation of the said resistances. If the generator be running at such speed that its voltage be above that of the battery, switch 17 will be closed and current will flow through the lead 11, battery 12, coil 20, main 16, switch 17 and lead 18 to the generator and the current flowing through the coil 20 will tend to draw the core 10 downwardly and increase the resistance 4. I so adjust said spring 9 that when the normal desired charging current is flowing through the coil 20, any appreciable increase in this current will depress the lever 8 and increase the resistance 4 in such manner as to hold the charging current substantially constant throughout speed changes of the generator. If this current through the battery be continued until the same be charged to that point that its voltage has reached the desired maximum to be held across the battery, then I so adjust the spring 5 that current flowing from the lead 11 to the lead 18, through the shunt coil 19, will prevent any increase in voltage upon the generator above this point by depressing the lever 6 and increasing the resistance 3 in a well known manner. If this voltage now be maintained, the current to the battery will decrease as its voltage further increases and if there be no lamp load upon the system, the battery may be carried at the maximum desired voltage which will be quite in excess of the voltage desired upon the lamp or translation circuit and quite in excess of that desired upon the generator and battery circuit when a lamp load is thrown on for, if there be no regulator in the lamp circuit, the lamps will then be carried at the maximum voltage that is desired across the battery, and if there be a lamp regulator as indicated at 23 in Fig. II, considerable loss will then take place therein. Closing of the work circuit switch 15, however, places the coil 21 in shunt across the generator circuit and I so adjust the variable resistance 22 that the coil 21, by assisting the coil 19, requires a lower voltage across the generator circuit to increase the resistance 3 and thus the standard voltage to be maintained by the voltage regulator operating the resistance 3 is lowered when the lamp circuit is thrown on.

The operation of the system shown in Fig. II may readily be followed from that described with regard to the system of Fig. I, it being only necessary to note that the coil 20 is traversed by the entire generator current in the system of Fig. II and, therefore, it is the total output of the generator that is controlled by the current regulator instead of the charging current only as shown in Fig. I.

I do not wish in any way to limit myself to the exact details of construction or mode of operation set forth in this specification which is merely given to illustrate an embodiment of my invention which is as set forth in the following claims:

1. The combination with a generator, and a translation circuit, of means for regulating the generator responsive to voltage fluctuations, means for regulating the generator responsive to current fluctuations and means for affecting the voltage-responsive means affected by making and breaking of the translation circuit.

2. The combination with a generator, and a translation circuit, of means for making and breaking the translation circuit, means for regulating the generator in response to voltage fluctuations, means for regulating the generator in response to current fluctuations and means whereby the voltage-responsive means is affected by the operation of the means for making and breaking the translation circuit.

3. The combination with a generator, and a translation circuit, of means for governing the generator to prevent a predetermined voltage from being exceeded, means for governing the generator to prevent a predetermined current from being exceeded and means for varying the value of the predetermined voltage affected by establishing and breaking of the translation circuit.

4. The combination with a generator, a translation circuit and means for making and breaking said circuit, of means for regulating the generator to hold constant voltage thereupon throughout speed changes, means for regulating the generator to hold a given current constant throughout speed changes and means for adjusting the voltage to be held constant throughout speed changes dependent upon making and breaking of the translation circuit.

5. The combination with a generator, a translation circuit and means for making and breaking the same, of means for regulating the generator to hold constant voltage thereupon throughout speed changes, means for regulating the generator to hold a given current constant throughout speed changes and means for adjusting the voltage to be held constant throughout speed changes dependent upon making and breaking the translation circuit independent of current consumption in the translation circuit.

6. The combination with a generator, and translation circuit, of means for regulating the generator responsive to voltage fluctuations and voltage actuated means for modifying the standard of regulation of the voltage responsive means affected by making and breaking of the translation circuit independent of the current used in said translation circuit.

7. The combination with a generator and translation circuit and means for regulating the generator responsive to voltage fluctuations and voltage actuated means for modifying the standard of voltage regulation affected by making and breaking of the translation circuit independent of the current used in the translation circuit.

8. The combination with a generator and a translation circuit, of means for regulating the generator responsive to voltage fluctuations, means for regulating the generator responsive to current fluctuations and means for modifying the standard of voltage regulation affected by making and breaking of the translation circuit.

9. The combination with a generator and a translation circuit, of means for regulating the generator responsive to voltage fluctuations, means for regulating the generator responsive to current fluctuations and means for modifying the standard of voltage regulation affected by making and breaking of the translation circuit independent of the current consumed in the translation circuit.

10. The combination with a generator, a storage battery and translation circuit, of means for regulating the generator to supply constant voltage across the battery, means for regulating the generator to supply a constant useful current and means for adjusting the voltage to be held across the battery operated by making and breaking of the translation circuit.

11. The combination with a generator, a storage battery and translation circuit, of means for regulating the generator to supply constant voltage across the battery, means for regulating the generator to supply a constant useful current and means for adjusting the voltage to be held across the battery operated by making and breaking of the translation circuit independent of the current consumed in said circuit.

12. The combination with a generator and translation circuit, of means whereby the generator is regulated in response to voltage fluctuations and voltage actuated means for affecting the voltage regulation thereof affected by manipulation of the translation circuit independent of the current consumed in the translation circuit.

13. The combination with a generator, a supply circuit and a translation circuit, of means for holding the voltage across the supply circuit from exceeding a predetermined limit, means for preventing the current in the supply circuit exceeding a predetermined limit and means for adjusting the voltage limit when the translation circuit is rendered operative and inoperative.

14. The combination with a generator, a supply circuit and a translation circuit, of means for holding the voltage across the supply circuit from exceeding a predetermined limit, means for preventing the current in the supply circuit exceeding a predetermined limit and means for adjusting the voltage limit when the translation circuit is rendered operative and inoperative independent of the current consumed in the translation circuit, comprising a coil affecting the voltage regulating means and in shunt across the translation circuit.

15. The combination with a generator and a translation circuit, of automatic means for regulating the generator to prevent its voltage exceeding a predetermined limit, means for regulating the generator to prevent its current exceeding a predetermined limit, means for making and breaking the translation circuit and simultaneously adjusting the voltage limit of the generator regulator.

JOHN L. CREVELING.

Witnesses:
ANNA MARIE WALL,
CHAS. McC. CHAPMAN.